United States Patent
Sbisa et al.

(10) Patent No.: US 7,062,030 B1
(45) Date of Patent: *Jun. 13, 2006

(54) METHOD AND SYSTEM FOR HANDLING CALLS IN A COMMUNICATION NETWORK

(75) Inventors: Daniel Charles Sbisa, Blue Springs, MO (US); Keith Eric Fenton, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 56 days.

This patent is subject to a terminal disclaimer.

(21) Appl. No.: 10/835,040

(22) Filed: Apr. 29, 2004

Related U.S. Application Data (63) Continuation of application No. 09/755,455, filed on Jan. 5, 2001, now Pat. No. 6,760,426.

(51) Int. Cl.
*H04M 3/523* (2006.01)
*H04M 7/00* (2006.01)

(52) U.S. Cl. ............ 379/221.09; 379/265.02; 379/265.13; 715/708

(58) Field of Classification Search ........ 345/708; 379/219, 220.01, 221.08, 221.09, 265.01, 379/265.02, 265.12, 265.13; 715/708
See application file for complete search history.

(56) References Cited

U.S. PATENT DOCUMENTS

| | | | |
|---|---|---|---|
| 5,418,844 A | 5/1995 | Morrisey et al. | |
| 5,448,633 A | 9/1995 | Jamaleddin | |
| 5,524,146 A | 6/1996 | Morrisey et al. | |
| 5,566,235 A | 10/1996 | Hetz | |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,684,866 A | 11/1997 | Florindi et al. | |
| 5,694,463 A | 12/1997 | Christie et al. | |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,920,562 A | 7/1999 | Christie et al. | |
| 5,923,745 A | 7/1999 | Hurd | |

(Continued)

FOREIGN PATENT DOCUMENTS

DE    199 54 224 A 1    5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—Harry S. Hong (57) ABSTRACT

A service control system processes call information to transfer first context information to a context server and to transfer the first call information to a destination server. The destination server processes the call information to transfer second context information for the call to the context server and to transfer destination information indicating a call destination to the service control system. The service control system processes the destination information to transfer routing information for the call to a communication network. The communication network processes the routing information to route the call to the call destination indicated by the destination information. The call destination processes the call to transfer third context information for the call to the context server. Billing information is generated the call based on the first context information, the second context information, and the third context information in the context server.

20 Claims, 8 Drawing Sheets

U.S. PATENT DOCUMENTS

| | | |
|---|---|---|
| 5,926,538 A | 7/1999 | Deryugin et al. |
| 5,933,486 A | 8/1999 | Norby et al. |
| 5,949,869 A | 9/1999 | Sink et al. |
| 5,987,118 A | 11/1999 | Dickerman et al. |
| 5,993,486 A | 11/1999 | Tomatsu |
| 6,075,855 A | 6/2000 | Christiansen et al. |
| 6,097,803 A | 8/2000 | Sbisa et al. |
| 6,148,069 A | 11/2000 | Ekstrom et al. |
| 6,215,864 B1 | 4/2001 | Goyal et al. |
| 6,262,992 B1 | 7/2001 | Nelson et al. |
| 6,470,081 B1 | 10/2002 | Sbisa et al. |
| 6,529,504 B1 | 3/2003 | Sbisa |
| 6,567,659 B1 | 5/2003 | Sbisa |
| 6,574,319 B1 | 6/2003 | Latter et al. |
| 6,603,851 B1 | 8/2003 | Smith et al. |
| 6,611,590 B1 | 8/2003 | Lu et al. |
| 6,690,656 B1 | 2/2004 | Christie et al. |
| 6,760,426 B1 | 7/2004 | Sbisa et al. |
| 2004/0032864 A1 | 2/2004 | Sibisa et al. |

FOREIGN PATENT DOCUMENTS

| | | |
|---|---|---|
| EP | 0 631 447 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.
U.S. Appl. No 09/345,936, filed Jul. 1,1999.
U.S. Appl. No.10/047,298, filed Jan.15, 2002.
U.S. Appl. No. 10/047,341, filed Jan. 15, 2002.
U.S. Appl. No. 10/192,942 filed Jul. 11, 2002.
U.S. Appl. No. 10/356,863, filed Jan. 3, 2003.
U.S. Appl. No. 10/277,377, filed Oct. 22, 2002.
U.S. Appl. No. 10/403,160 filed Mar. 31, 2003.
U.S. Appl. No. 10/436,625 filed May 13, 2003.
U.S. Appl. No. 10/642,863, filed Aug. 18, 2003.

METHOD AND SYSTEM FOR HANDLING CALLS IN A COMMUNICATION NETWORK

RELATED APPLICATIONS

This patent application is a continuation of application Ser. No. 09/755,455, now U.S. Pat. No. 6,760,426, filed Jan. 5, 2001, entitled "Method and System for Handling Operator Calls In a Communication Network," which is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a method and system for handling calls in a communication network that require operator assistance.

2. Background

In a communications network, a Service Control Point (SCP) provides call routing information to telecommunications switches. In a typical call routing operation, the telecommunications switch receives a call request and transmits a query message to the SCP. The SCP processes the query message and returns a response message containing the routing information to the switch. For example, the switch may receive an "800" number call and query the SCP with the "800" number. The SCP processes the "800" number and returns a routing number to the switch. These query and response messages are typically Signaling System #7 (SS7) Transaction Capabilities Application Part (TCAP) messages that are well known in the art.

In some call scenarios, the communications network also uses a telecommunications resource to provide services to a call before the call is routed to a destination. An operator center is one example of a telecommunications resource used to provide these services. In some instances operator centers comprise several individual operators working at individual operator workstations to provide the various services to calls. In other instances the operator center is automated and provides the services using one or more voice response units.

To connect a call to an operator center, the communications network often obtains routing information from an SCP. The routing information can be information on a switch and connection coupled to the operator center. The operator center typically provides a service to the call based on the called and calling number that are provided over the connection. When the operator service is completed, the operator center directs the network to use a new connection to extend the call to the call destination.

To determine how to handle a call, it is desirable to provide context information to the operator center. The context information is information related to the call that is collected or generated by the various devices in a communications network. Some examples of context information are: the call ID, template ID, TCAP message transaction ID, originating switch ID, SCP ID, call detail record (CDR) record type, called number, nature of the called number, calling number, nature of the calling number, account codes, authorization codes, credit card numbers, calling card numbers, query class, query sequence number, service type, call-leg sequence, DNIS, and out-dial number. The context information for the call is typically stored in the SCP or in a remote context server.

Figure 1:
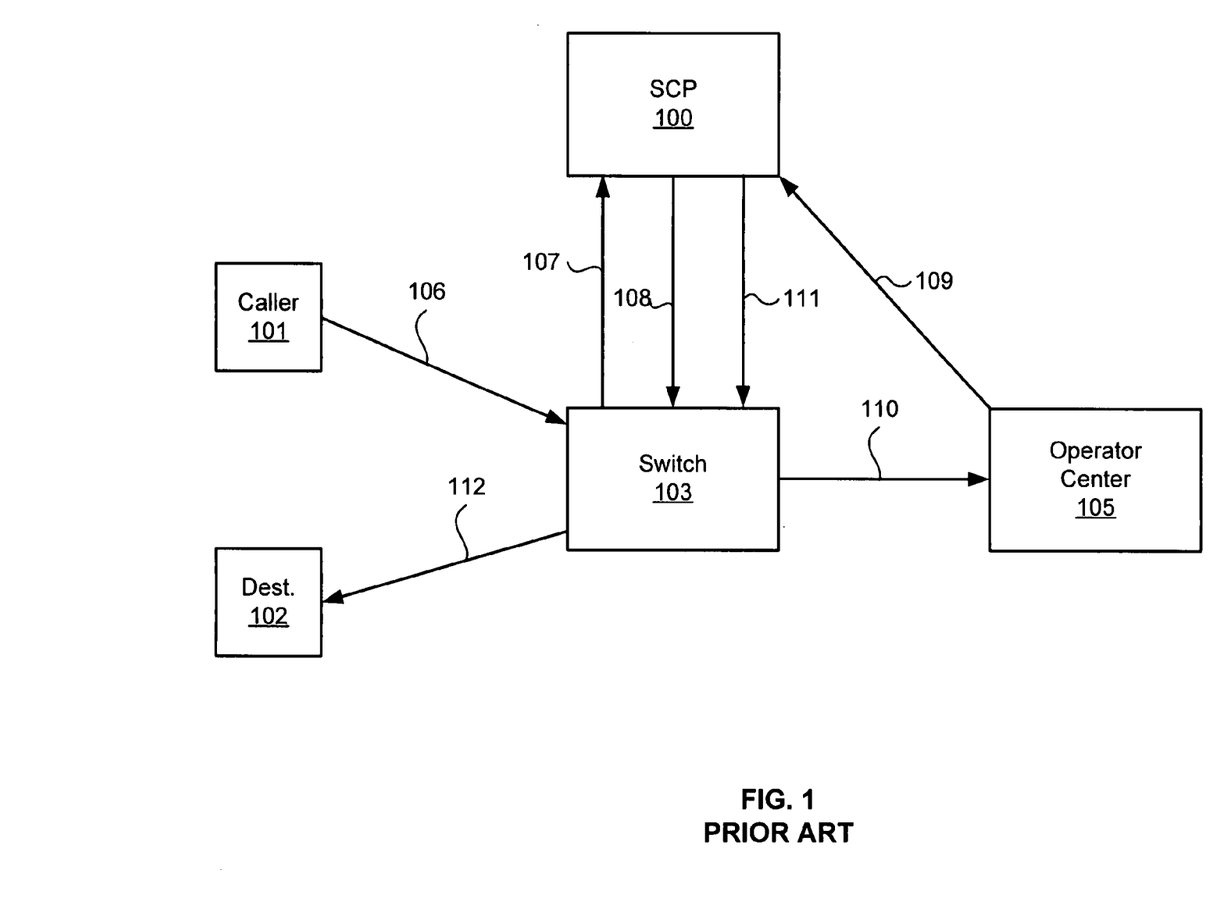
FIG. 1 is a prior art block diagram illustrating a call requiring operator assistance in a communications network.

FIG. 1 illustrates an example of a call session that requires an operator service to complete the call. On FIG. 1 the caller 101 places a call to the destination 102. In response to the call placement, a call request 106 is provided to the telecommunications switch 103. In response to determining the call request is an operator call request that requires information from the SCP 100, the telecommunications switch 103 processes the call request 106 to generate a query message 107 for the SCP 100. The query message 107 includes a request for call handling information for the call. The SCP 100 receives the query message and generates call handling information for the call, which includes routing instructions for the switch 103. The SCP 100 generates a response message 108 that contains the call handling information and transmits the response message 108 to the switch 103. The call handling information causes the switch 103 to extend the call over the connection 110 to the operator center 105.

The operator center 105 receives the call over the connection 110 and processes the call to provide a service to the call. After providing the service, the operator center 105 generates a transfer message 109 for the SCP 100. The SCP 100 receives the transfer message 109 and processes the transfer message 109 to select call handling information for the call. The SCP 100 generates a response message 111 that contains the call handling information and transmits the response message 111 to the switch 103. The call handling information causes the switch 103 to disconnect the operator center 105 and extend the call over connection 112 to the destination 102 to complete the call.

Unfortunately, the connection 110 between the operator center 105 and switch 103 is a proprietary connection that supports unique functionality between the switch 103 and the operator center 105. Thus, the switch 103 cannot support tandem routing to allow the switch 103 to route a call to other operator centers connected to other switches.

It is also known in the art to use an on-site routing node at an operator center that communicates with an SCP to provide call routing to individual operators at the operator center. For example, a technical support department of a company that has a large number of individual operators might use an on-site routing node to route incoming calls to specific operators. This prevents calls from being routed to an operator who is on a lunch break or not currently at an operator station. When an operator will not be at the operator station, the operator sends a message to the on-site routing node. The on-site routing node then will not route calls to that operator station.

Unfortunately, context information is not available to the on-site routing node during the selection of an operator at the operator center. Therefore a need exists in the art for a method and system for handling calls in a communications network that require operator assistance.

SUMMARY

In some examples of the invention, a communication network receives a call and responsively transfers call information to a service control system. The service control system processes the call information to transfer first context information for the call to a context server and to transfer the first call information to a destination server. The destination server processes the call information to transfer second context information for the call to the context server and to transfer destination information indicating a call destination for the call to the service control system. The service control system processes the destination information to transfer routing information for the call to the communication network. The communication network processes the routing information to route the call to the call destination indicated by the destination information. The call destination processes the call to transfer third context information for the call to the context server. The context server stores the first context information, the second context information, and the third context information. Billing information is generated for the call based on the first context information, the second context information, and the third context information in the context server.

DETAILED DESCRIPTION

Figure 2:
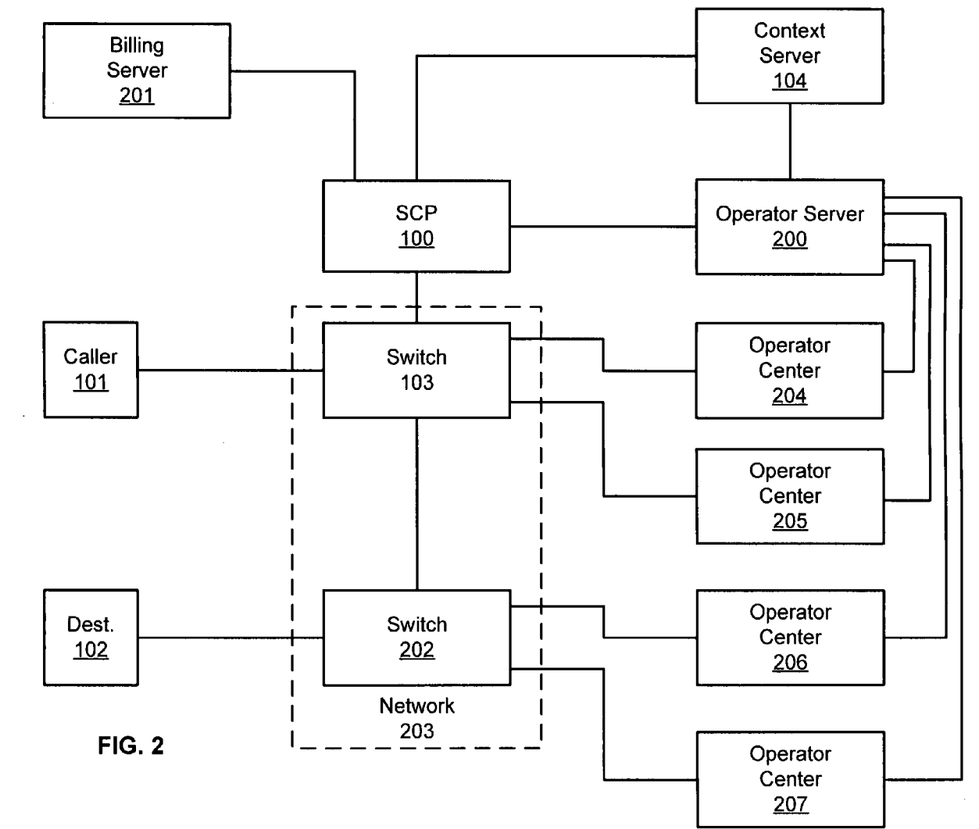
FIG. 2 is an example of a network architecture for a telecommunication system according to the present invention.

Network Architecture—FIG. 2

FIG. 2 depicts a network 203, an SCP 100, a caller 101, a billing server 201, a destination 102, a context server 104, an operator server 200 and operator centers 204–207. The network 203 comprises a switch 103 connected to another switch 202. The switch 103 is connected to the SCP 100, the caller 101, and the operator centers 204 and 205. The switch 202 is connected to the destination 102 and the operator centers 206 and 207. The SCP 100 is connected to the operator server 200, the billing server 201, and the context server 104. The operator server 200 is connected to the context server 104 and the operator centers 204–207. It will become apparent from the following description that in some examples of the present method and system, the context server 104 is also connected to the operator centers 204–207 although this is not shown on FIG. 2 for clarity. Those skilled in the art will appreciate that there are typically numerous callers, destinations, and other conventional components associated with a communications network that are also not shown on FIG. 2 for reasons of clarity.

The switches 103 and 202 are network elements that are capable of extending and disconnecting communications paths in response to signaling messages. The switches 103 and 202 are linked with one another to exchange signaling messages. An example of the signaling messages include without limitation, Signaling System #7 (SS7). Some examples of the switches 103 and 202 are class 4 switches, ATM switches, and wireless switches. One specific example of a class 4 switch is the DMS-250 that is supplied by Nortel. The switches 103 and 202 extend communications paths over connections such as dedicated access lines, ISDN connections, DS0 connections, ATM connections, and wireless connections.

The SCP 100 is a processing system that receives query and transfer messages and returns response messages. Typically, the query and response messages are well known SS7 TCAP messages. One example of the SCP 100 is an SCP supplied by the Tandem Corporation that is configured and operated according to the following disclosure. The SCP 100 is linked to the switch 103 over a link with one example being an SS7 link. The context server 104 is a processing system for storing and providing context information for calls with one example being a TCP/IP server. The billing server 201 could be any server configured to receive and store billing information for calls.

The operator centers 204–207 are conventional operator centers that provide a variety of services to calls. Some examples of the operator services include without limitation, collect calls, third party billed calls, calling card billed calls, station to station calls, and person-to-person calls. In some examples of the invention, the operator centers 204–207 could comprise automated operator centers using interactive voice response technology and speech recognition to provide the various operator services. In other examples of the present invention, the operator centers 204–207 could comprise one or more human operators and operator workstations. In yet other examples of the present invention, some of the operator centers 204–207 could comprise automated operator centers while other ones of the operator centers 204–207 could comprise human operators and operator workstations.

Aside from the modifications for the invention disclosed herein, the components and connections depicted on FIG. 2 are conventional and well known in the art. Those skilled in the art recognize that there are numerous variations of the components and architecture depicted on FIG. 2 that also include a service control processing system, a switching system, an operator server, and operator centers. The invention is not restricted to the specific components and architecture depicted on FIG. 2, but applies to the various related architectures and components containing a service control processing system, a switching system, an operator server, and operator centers.

Figure 3:
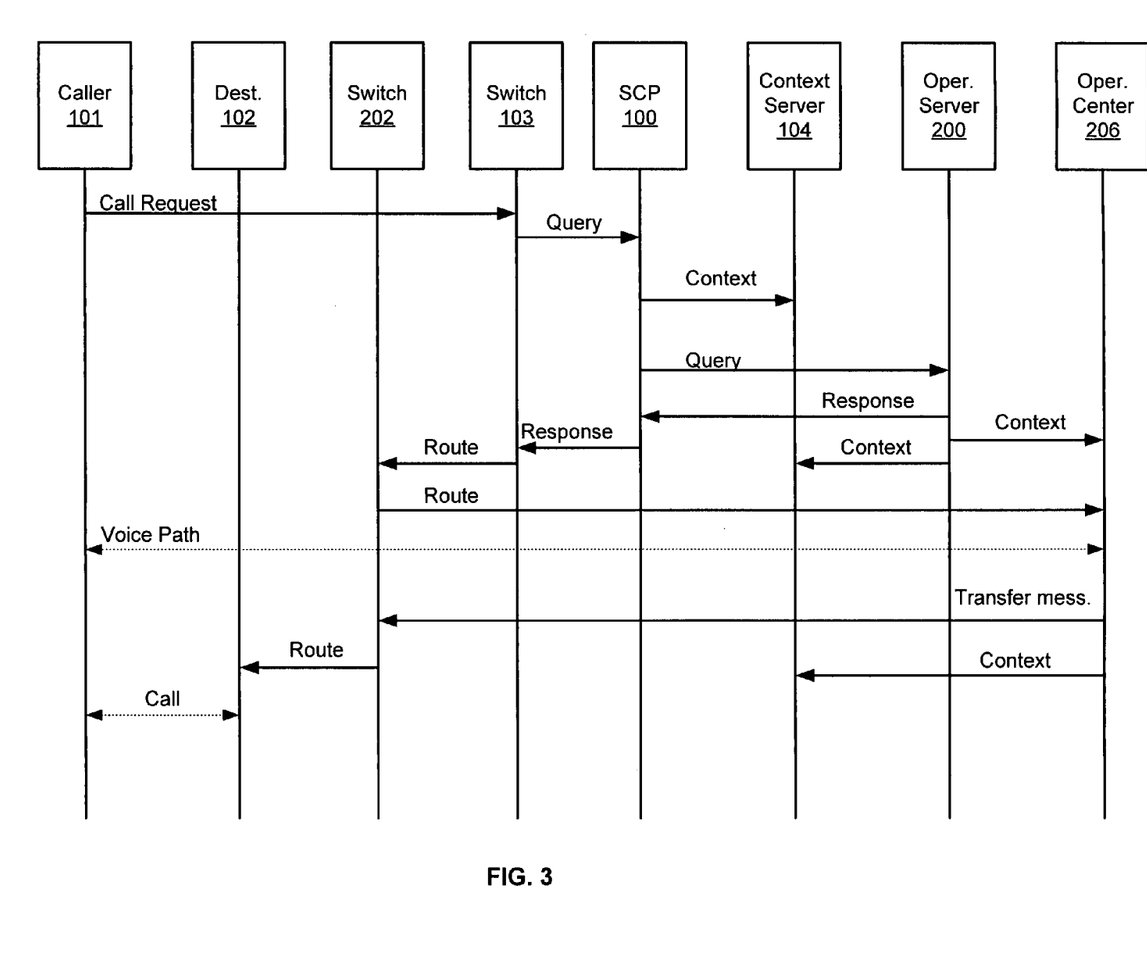
FIG. 3 is a message sequence chart illustrating an example of the operation of a telecommunication system according to the present invention.

Network Operations—FIGS. 3–8:

FIG. 3 is a message sequence chart that depicts the operation of the invention in some embodiments. It is anticipated however, that one skilled in the art will recognize numerous other examples in accordance with the principles described below, and thus, the following examples are for the purpose of illustration and not limitation. Those skilled in the art will also appreciate that various features described below could be combined to form multiple variations of the invention.

On FIG. 3, the caller 101 places a call to the call destination 102. In response to the call placement, a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

Context information can either be stored in the SCP 100 or in the context server 104. A context location indicator in the SCP 100 and the first digit of the call ID could identify the device that stores the context information for the call. In this example, the context information is stored in the context server 104. Thus, the SCP 100 establishes context information for the call by generating a context information message containing the context information. The SCP 100 transmits the context information message to the context server 104. The context information message establishes context information for the call in the context server 104. The context server 104 receives and stores the context information under the call ID.

The SCP 100 also generates a second query message and transmits the second query message to the operator server 200. The second query message includes a request for an operator center to handle the call and includes the context information for the call. The operator server 200 processes the second query message to determine an optimal one of the operator centers 204–207 to handle the call based on the context information provided in the second query message. For example, the nature of the call could be such that an automated operator center would be the optimal operator center to handle the call. In another example, the nature of the call could be such that a human operator is required to handle the call. In determining the optimal one of the operator centers 204–207, the operator server 200 processes the second query message to determine if enough context information is provided in the second query message to select the optimal one of the operator centers 204–207. In this case, sufficient context information exists for the call and the operator server 200 generates a response message for the SCP 100 that includes information on the selected one of the operator centers 204–207. The operator server 200 also generates and provides a context information message to the selected one of the operator centers 204–207. In this case operator center 206. The operator server 200 also generates and provides a context information message for the context server 204. The context server 204 processes the context information message to update the context information for the call.

The SCP 100 processes the response message to generate call handling information that includes routing instructions to the selected one of the operator centers 204–207. Typically, the routing instructions are the identity of a connection to the selected operator center, e.g. 206, or the identity of a switch, e.g. 202, and connection that are connected to the selected operator center, e.g. 206. The SCP 100 generates a second response message for the switch 103 that includes the call handling information. The switch 103 receives the response message from the SCP 100 and processes the response message to route the call to the switch 202. The switch 202 in turn routes the call to the operator center 206 and establishes a voice path between the selected operator center 206 and the caller 101. The operator center 206 processes the call using the context information provided by the operator server 200 to provide the required service to the call. In response to providing the required service to the call, the operator center 206 provides a transfer message to the switch 202. The transfer message contains the information required by the switch 202 to select a new connection. For example the transfer message could contain an out-dial number for the call destination 102. An out-dial number is typically a conventional telephone number. The operator center 206 also provides a context message to the context server 104. The context server 104 processes the context message to update the context information for the call. The switch 202 processes the transfer message to route the call to the destination 102 and complete the call between the caller 101 and the destination 102.

Figure 4:
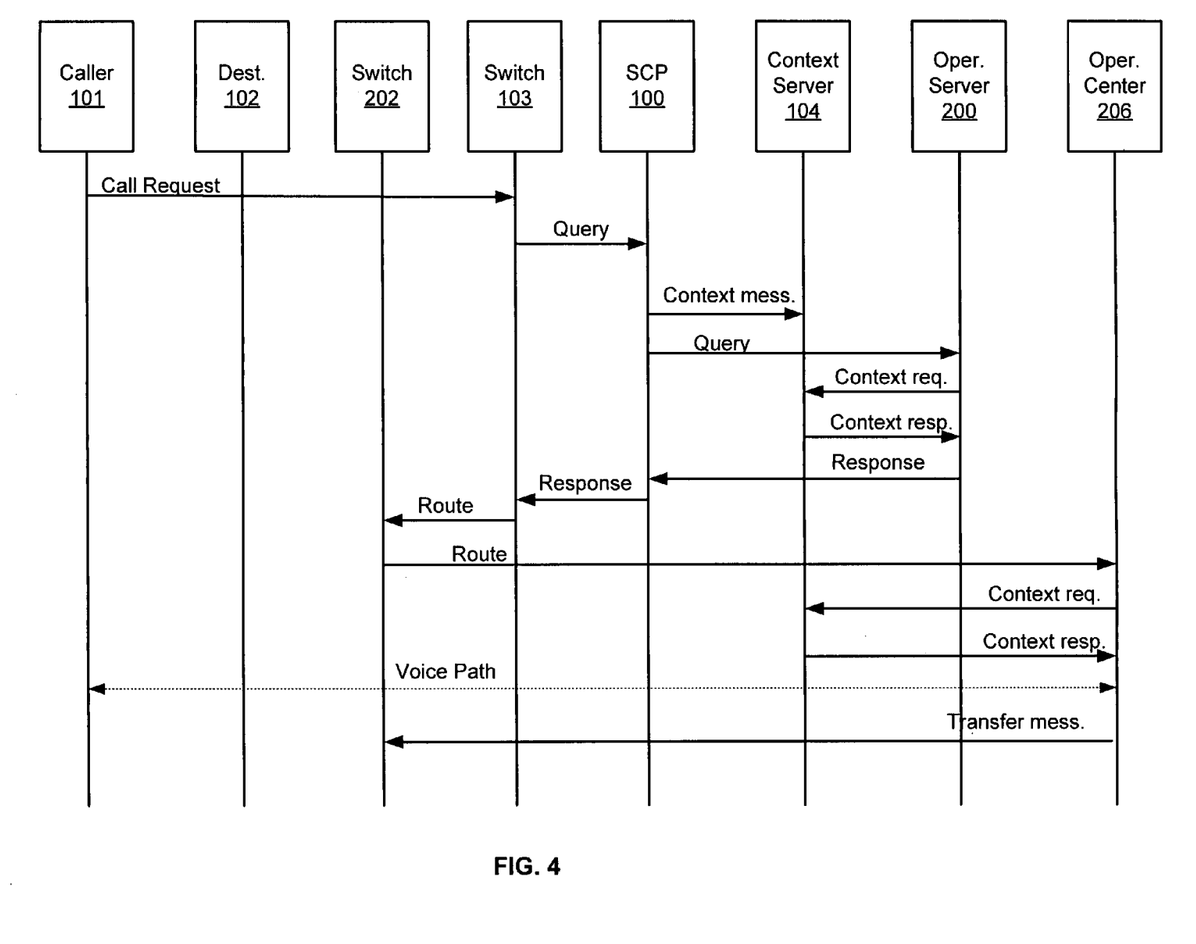
FIGS. 4 and 5 are a message sequence chart illustrating another example of the operation of a telecommunication system according to the present invention.
Figure 5:
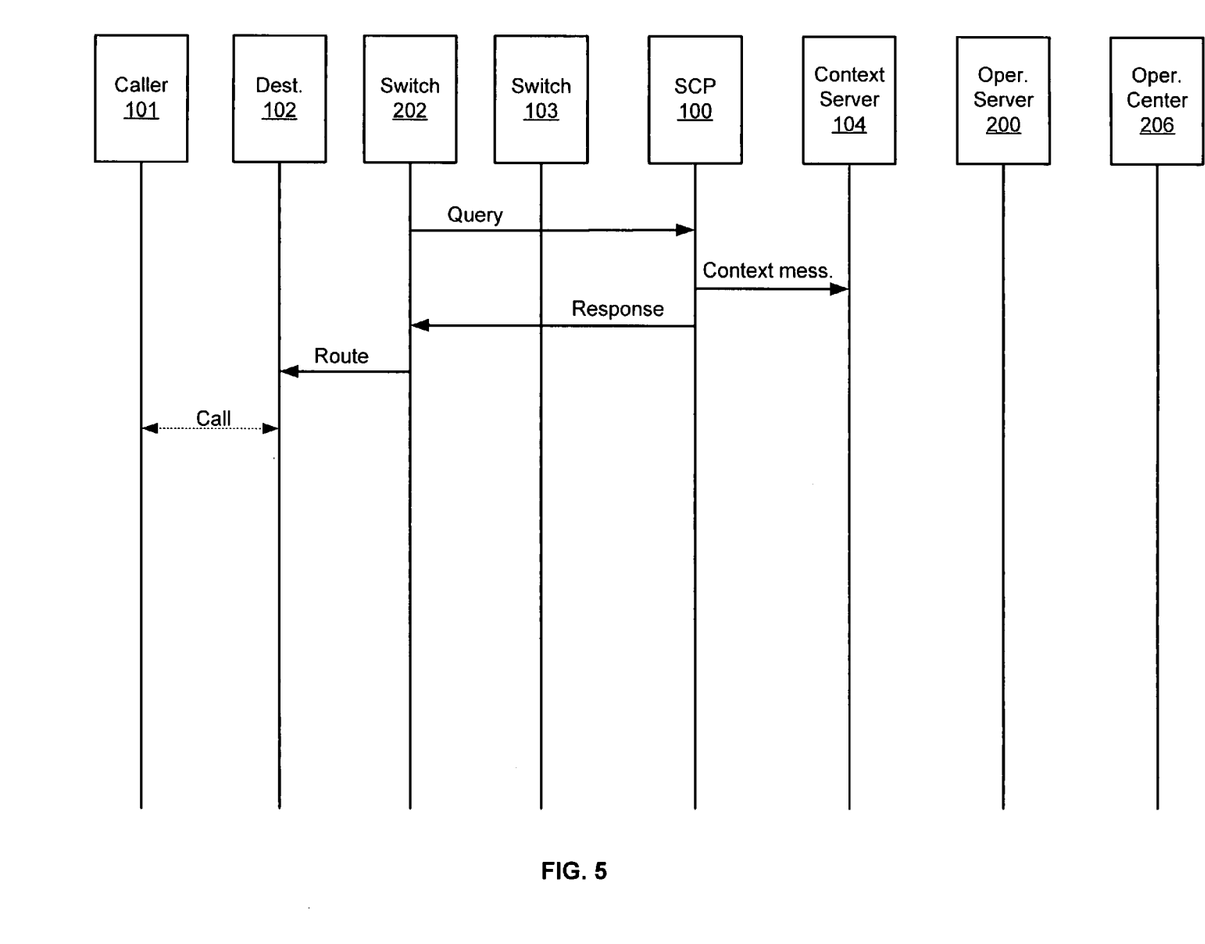

FIGS. 4 and 5 are a message sequence chart that depicts additional examples of the operation of the invention. In the examples of FIGS. 4 and 5, the switch 202 re-queries the SCP 100 for routing information, and the operator center 206 queries the context server 104 for the context information rather than receive the context information from the context server 104.

On FIG. 4, the caller 101 places a call to the call destination 102. In response to the call placement a call request enters the network 203 and is received by the switch 103. The switch 103 processes the call, and determines that an operator service is required. The operator service could be identified through the dialing pattern of the call, such as where a leading "0" or a "0" with no appended digits is dialed. As a result, the switch 103 assigns a trigger index value to the call and sends a query message for the call to the SCP 100. The trigger index value is used by the SCP 100 to determine that the call requires operator assistance. The SCP 100 receives and processes the query message to assign a unique call ID to the call that is used to associate context information and messages with the call. The SCP 100 also establishes context information for the call and generates a context information message containing the context information. The SCP 100 transmits the context information message to the context server 104. The context information message establishes context information for the call in the context server 104. The context server 104 receives and stores the context information under the call ID.

The SCP 100 generates a second query message and transmits the second query message to the operator server 200. The second query message includes a request for an operator center to handle the call and includes the context information for the call. The operator server 200 processes the second query message to determine if enough information is provided in the second query message to select the optimal one of the operator centers 204–207. For example, where the call is a re-origination call, context information from the prior call attempt could be available and used to select the optimal one of the operator centers 204–207. In this case additional information is available and the operator server 200 generates and provides a context request message to the context server 104. The context request message contains the call ID and a template ID provided to the operator server 200 by the SCP 100 in the query message. The template ID indicates the set of information required by the operator server 200. For example, a template ID of "1" requests a set of context information including: the call ID, the template ID, the originating switch ID, the called number, the calling number, the call-leg count, and the record type. Other template IDs could be used to request additional information such as the SCP ID, the query class, and resource information.

The context server 104 receives the context request message and uses the call ID to retrieve the context information for the call. The context server 104 uses the template ID to select the set of context information to provide in a context response message to the operator server 200 and provides the context response message to the operator server 200. The operator server 200 processes the context information to determine the optimal one of the operator centers 204–207 to handle the call. In some examples of the invention, the operator server 200 could also monitor the operator centers 204–207 for call volume and use the call volume information to select the optimal operator center to handle the call based on call volume and the context information. The operator server 200 then generates and transmits a response message for the SCP 100 that includes information on the selected one of the operator centers 204–207. In this case the operator center 206.

The SCP 100 processes the response message to generate call handling information that includes routing instructions to the selected one of the operator centers 204–207. The SCP 100 generates and transmits a second response message to the switch 103 that includes the call handling information. The switch 103 receives the response message from the SCP 100 and routes the call to the switch 202. In response to the call routing, the switch 202 routes the call to the selected operator center 206 and establishes a voice path between the selected operator center 206 and the caller 101. Typically, the route message to the operator center 206 consists of a series of digits that are out-pulsed from the switch 202 to the operator center 206 over the connection. For example, the out-pulsed digits could indicate the call ID to the operator center 206. In this example the operator center 206 does not receive the context information from the operator server 200. Rather, the operator center 206 processes the call to generate a second context request message for the context server 104. The context server 104 receives the second context request message and uses the call ID to retrieve the context information. The context server 104 uses the template ID to select a set of context information to provide in a context response message to the operator center 206.

In response to receiving the context response message, the operator center 206 processes the call to provide the required service to the call using the context information. In response to providing the required service to the call, the operator center 206 provides a transfer message to the switch 202. Referring to FIG. 5, the switch 202 receives the transfer message and processes the transfer message to determine that additional call handling instructions are required to complete the call. For example, the transfer message could include an "800" out-dial number requiring translation into a call destination number by the SCP 100. The switch 202 processes the transfer message to send a second query message for the call to the SCP 100. The SCP 100 receives and processes the query message to generate second call handling instructions for the call that include instructions to route the call to the call destination 102. The SCP 100 provides the second call handling information to the switch 202 in a response message and generates and transmits another context information message to the context server 104. The context server 104 processes the context message to update the context information for the call.

In response to receiving the second call handling information from the SCP 100, the switch 202 disconnects the operator 206 and extends the call to the destination 102. In some examples of the invention, the switch 202 could also send a message to the SCP 100 that the operator center has been disconnected.

Figure 6:
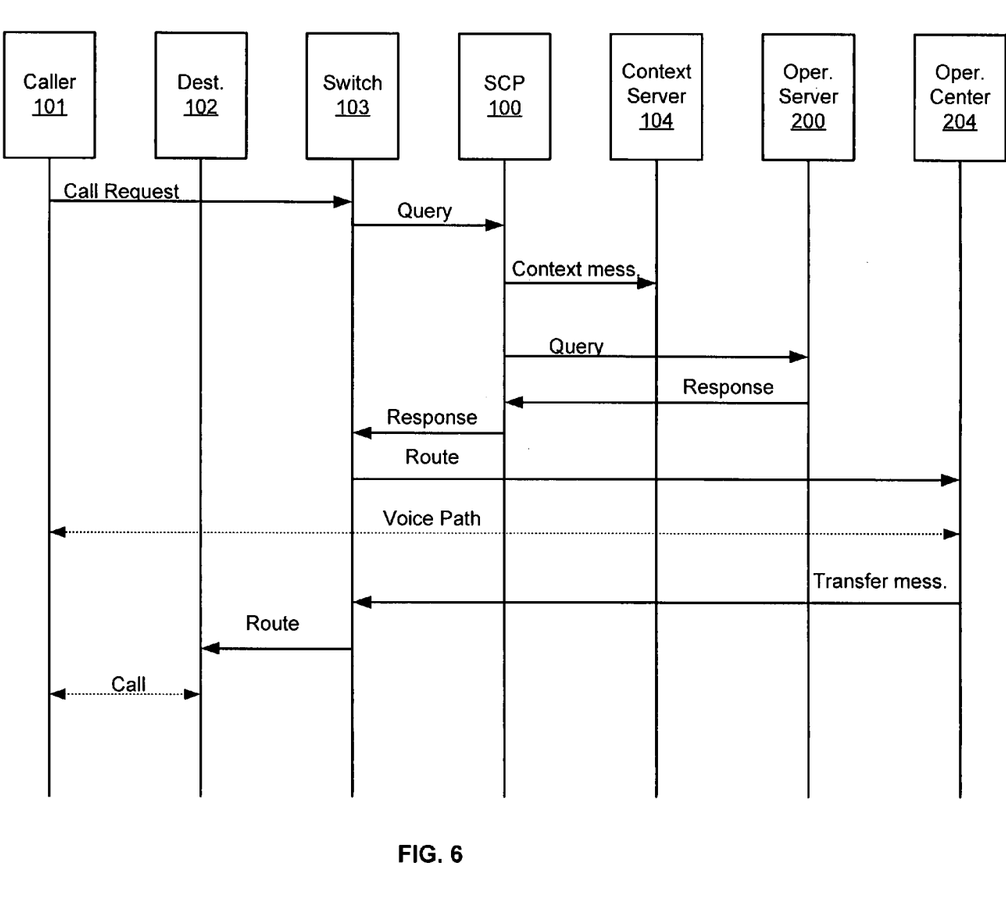
FIG. 6 is a message sequence chart illustrating another example of the operation of a telecommunication system according to the present invention.

FIG. 6 is a message sequence chart that depicts another example of the operation of the invention in some embodiments. On FIG. 6, the caller 101 places a call to the call destination 102. In response to the call placement a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

The SCP 100 generates a second query message and transmits the second query message to the operator server 200. The second query message includes a request for an operator center to handle the call and includes context information for the call. In this case the operator server 200 processes the second query message determine an optimal group of operator centers from the available operator centers 204–207 to handle the call based on the context information provided in the second query message. For example, the operator server 200 could select operator centers 204 and 205 and generate and provide a response message to the SCP 100 with information on the selected group of operator centers, in this case operator center 204 and 205.

The SCP 100 processes the response message to select one of the operator centers 204 and 205 to handle the call. The SCP 100 also generates call handling information that includes routing instructions to the selected one of the operator centers 204 and 205. In this case operator center 204. The SCP 100 generates a second response message for the switch 103 that includes the call handling information. The switch 103 receives the response message from the SCP 100 and processes the response message to route the call to the selected operator center 204 and establishes a voice path between the selected operator center 204 and the caller 101. It should be noted that the context information for the call could be provided by the operator server 200, as in the example of FIG. 3, or could be retrieved by the selected operator center 204, as in the example of FIGS. 4 and 5, as a matter of design choice. The operator center 204 processes the call to provide the required service to the call. In response to providing the required service to the call, the operator center 204 provides a transfer message to the switch 103. The switch 103 processes the transfer message to disconnect the operator center 204 route the call to the destination 102 and complete the call between the caller 101 and the destination 102. If additional call handling information is required to route the call, the switch 103 could query the SCP 100 as in the examples of FIGS. 4 and 5 or could use internal processing logic to route the call.

Figure 7:
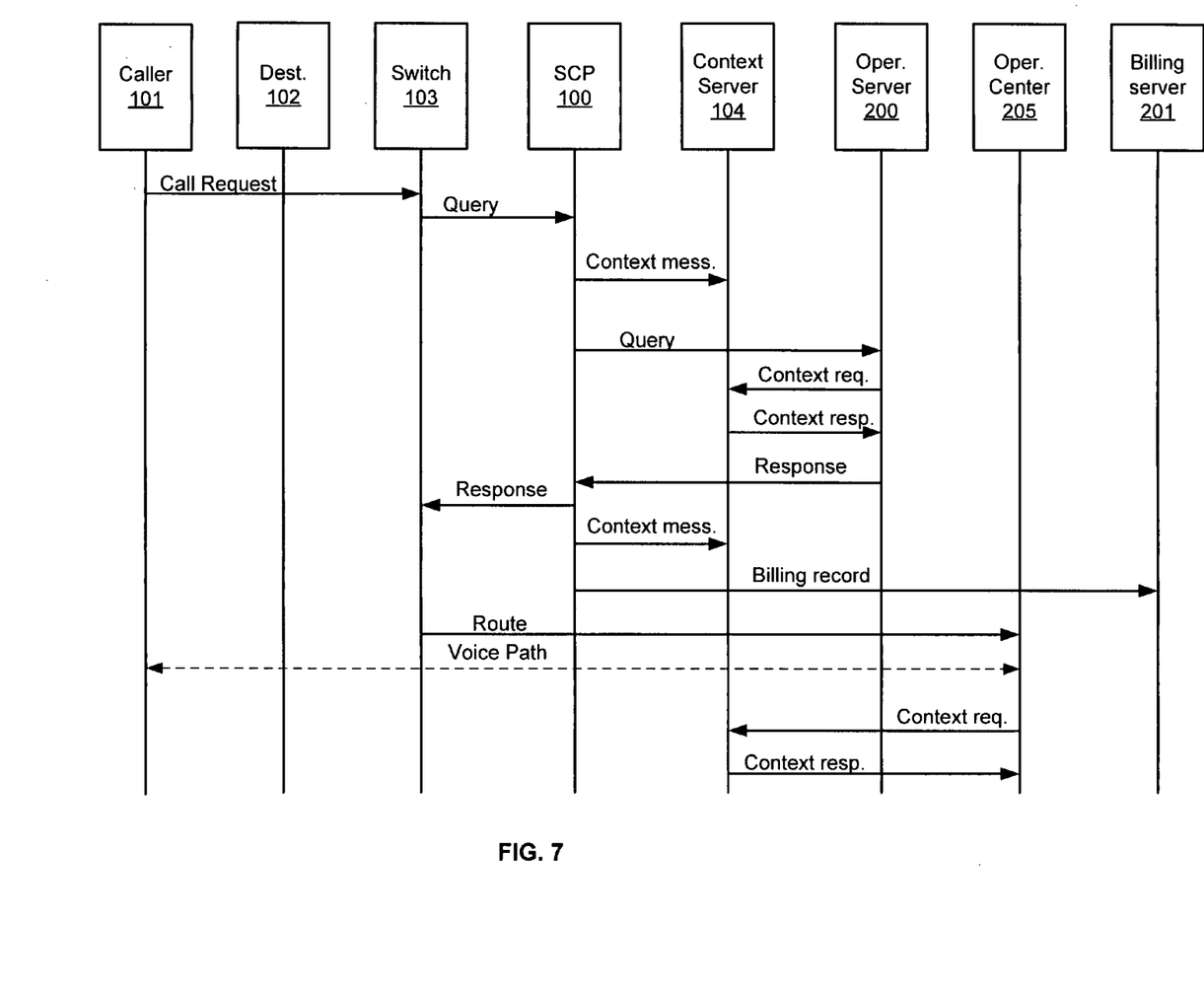
FIGS. 7 and 8 are a message sequence chart illustrating another example of the operation of a telecommunication system according to the present invention.

FIG. 7 is a message sequence chart that depicts another example of the operation of the invention in some embodiments. On FIG. 7 the caller 101 places a call to the call destination 102. In response to the call placement a call request enters the network 203 and is received by the switch 103. The switch 103 processes the call request, and as a result, the switch 103 triggers and sends a query message for the call to the SCP 100. The SCP 100 receives and processes the query message to determine that the call requires operator assistance for completion. The SCP 100 also assigns a unique call ID to the call that is used to associate context information and messages with the call.

The SCP 100 also generates a second query message and transmits the second query message to the operator server 200. The second query message includes a request for an operator center to handle the call and includes the context information for the call. The operator server 200 processes the second query message to determine if enough information is provided in the second query message to select the optimal one of the operator centers 204–207. In this case additional information is available and the operator server 200 generates and provides a context request message to the context server 104. The context server 104 receives the context request message and uses the call ID to retrieve the context information. The context server 104 uses the template ID to select a set of context information to provide in a context response message to the operator server 200. In response to receiving the context response message, the operator server 200 processes the second query message determine an optimal operator center from the available operator centers 204–207 to handle the call based on the context information. The operator server also generates and provides a response message to the SCP 100 with information on the selected operator center. In this case operator center 205. The SCP 100 processes the response message to generate call handling information that includes routing instructions to the selected operator center 205 and provides a second response message to the switch 103 that includes the call handling information. The SCP 100 then provides a context information message to the context server 104 with updated context information for the call. Additionally, in this example, the SCP 100 also generates a billing record for the call and provides the billing record to the billing server 201. The billing server 201 processes the billing record to generate a billing file for the call and stores the billing file.

Figure 8:
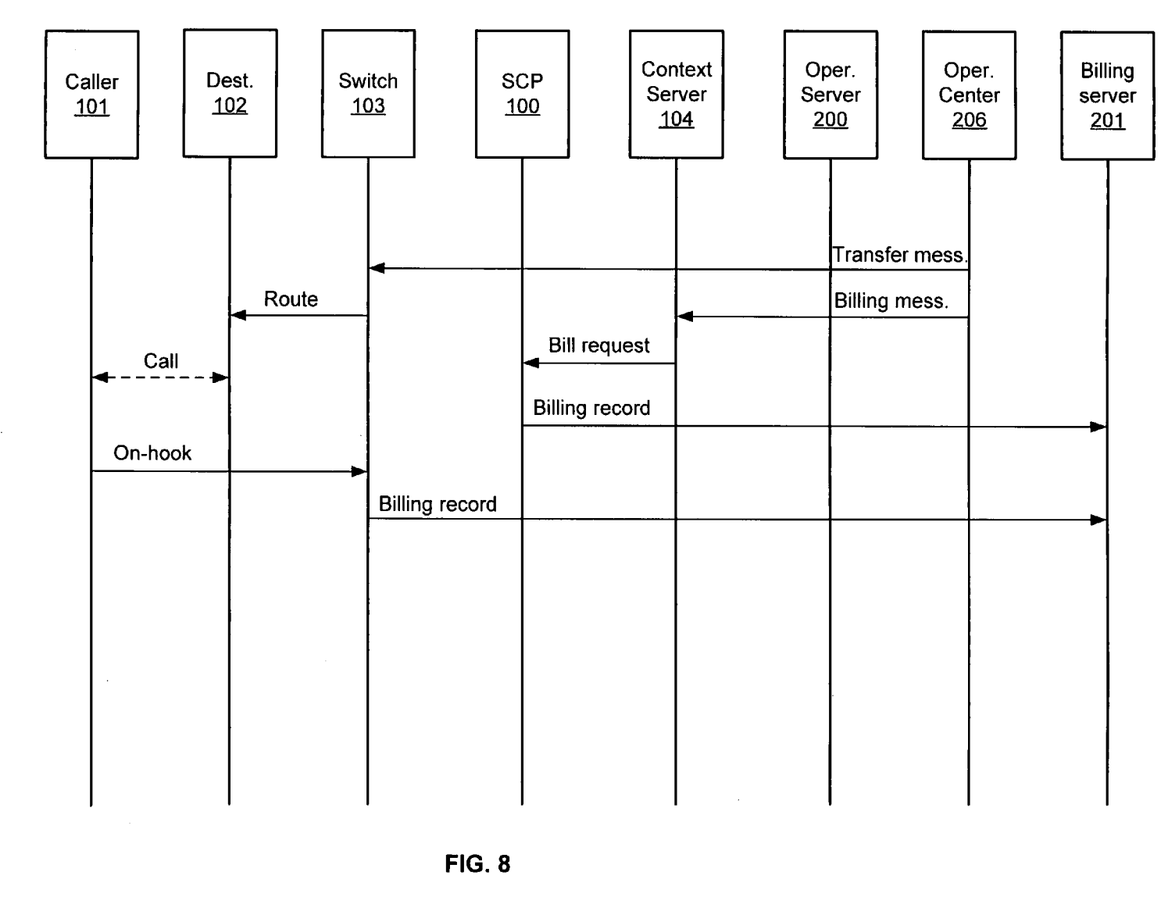

In response to receiving the second response message from the SCP 100, the switch 103 processes the response message to route the call to the selected operator center 205 and establishes a voice path between the selected operator center 205 and the caller 101. In this example, the operator center 205 does not receive the context information from the operator server 200. Rather as in the above example, the operator center 205 processes the call to generate a context request message for the context server 104. The context server 104 receives the second context request message and uses the call ID to retrieve the context information provides the context response message to the operator center 205. Referring to FIG. 8, the operator center 205 then processes the call to provide the required service to the call. In response to providing the required service to the call, the operator center 205 provides a transfer message to the switch 103. The switch 103 processes the transfer message to route the call to the destination 102 and complete the call between the caller 101 and the destination 102. In response to providing the transfer message, the operator center 205 also generates and provides a billing information message to the context server 104 that includes billing information for the call. The context server 104 processes the billing information message to store the billing information in the context file and generates and provides a billing request message to the SCP 100. The SCP 100 processes the billing request message to generate another billing record for the billing server 201. The billing server 201 processes the billing record to update the billing file for the call.

In response to an on-hook message from the caller 101, the switch 103 processes the on-hook message to generate a billing record for the call and provides the billing record to the billing server 201. The billing server 201 processes the billing record to complete the billing file for the call.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A method of handling a call comprising:
   in a communication network, receiving the call and responsively transferring call information to a service control system;
   in the service control system, processing the call information to transfer first context information for the call to a context server and to transfer the first call information to a destination server, wherein the destination server processes the call information to transfer second context information for the call to the context server and to transfer destination information indicating a call destination for the call to the service control system;
   in the service control system, processing the destination information to transfer routing information for the call to the communication network;
   in the communication network, processing the routing information to route the call to the call destination indicated by the destination information, wherein the call destination processes the call to transfer third context information for the call to the context server;
   in the context server, storing the first context information, the second context information, and the third context information; and
   generating billing information for the call based on the first context information, the second context information, and the third context information in the context server.

2. The method of claim 1 wherein generating billing information for the call comprises, transferring the first context information, the second context information, and the third context information from the context server to the service control system and generating the billing information in the service control system.

3. The method of claim 1 wherein generating billing information for the call comprises generating the billing information in the context server.

4. The method of claim 1 further comprising transferring the first context information from the context server to the destination server, wherein the destination server selects the destination information based on the first context information.

5. The method of claim 1 further comprising transferring the first context information and the second context information from the context server to the call destination, wherein the call destination processes the call based on the first context information and the second context information.

6. The method of claim 1 wherein the destination server comprises an operator server and the call destination comprises an operator center.

7. The method of claim 1 wherein the destination server comprises a voice response system.

8. The method of claim 1 wherein the service control system comprises a Service Control Point (SCP).

9. The method of claim 1 wherein the first context information identifies an originating switch for the call in the communication network.

10. The method of claim 1 wherein the service control system comprises a Service Control Point (SCP) and the first context information identifies the SCP.

11. The method of claim 1 wherein the first context information identifies a calling number.

12. The method of claim 1 wherein the first context information identifies a nature of a called number.

13. The method of claim 1 wherein the first context information identifies a nature of a calling number.

14. The method of claim 1 wherein the first context information identifies a query sequence number.

15. The method of claim 1 wherein the second context information identifies DNIS digits.

16. The method of claim 1 wherein the third context information comprises an outdial number.

17. The method of claim 1 wherein the third context information comprises a social security number.

18. The method of claim 1 wherein the third context information comprises an account code.

19. The method of claim 1 wherein the third context information comprises a card number.

20. The method of claim 1 wherein the third context information comprises an caller-entered digits.

* * * * *